Oct. 6, 1953                K. P. RYAN                2,654,198
                           DISK HARROW
Filed Feb. 18, 1949                          2 Sheets-Sheet 2

Inventor
Kelly P. Ryan

By *Clarence A. O'Brien and Harvey B. Jacobson*
                                    Attorneys

UNITED STATES PATENT OFFICE 2,654,198

DISK HARROW

Kelly P. Ryan, Blair, Nebr., assignor to Kelly Ryan Equipment Company, Blair, Nebr., a corporation of Nebraska Application February 18, 1949, Serial No. 77,127

4 Claims. (Cl. 55—81)

This invention relates to new and useful improvements in disk harrows and the primary object of the present invention is to provide a disk harrow having a plurality of pivotal sections each of which supports land working elements, and embodying novel and improved means for selectively adjusting the pivotal sections relative to each for making furrows, ditches or the like which are spaced relative to each other a predetermined distance.

Another important object of the present invention is to provide a disk harrow including a pair of main frames which are pivoted to each other, a slidable beam connected to the frames for selective angular disposition of the frames relative to each other, and novel and improved locking means for retaining the frames at a selected, predetermined inclined position relative to each other.

A further object of the present invention is to provide a disk harrow including a plurality of detachable sections that are removably secured to each other for working land in predetermined paths of various widths.

A still further aim of the present invention is to provide a disk harrow that is simple and practical in construction, strong and reliable in use, neat and attractive in appearance, small and compact in structure, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 6 is an enlarged transverse vertical sectional view taken substantially on the plane of section line 6—6 of Figure 1; and Figure 7 is an enlarged fragmentary, transverse vertical sectional view taken substantially on the plane of section line 7—7 of Figure 1.

Figure 1:
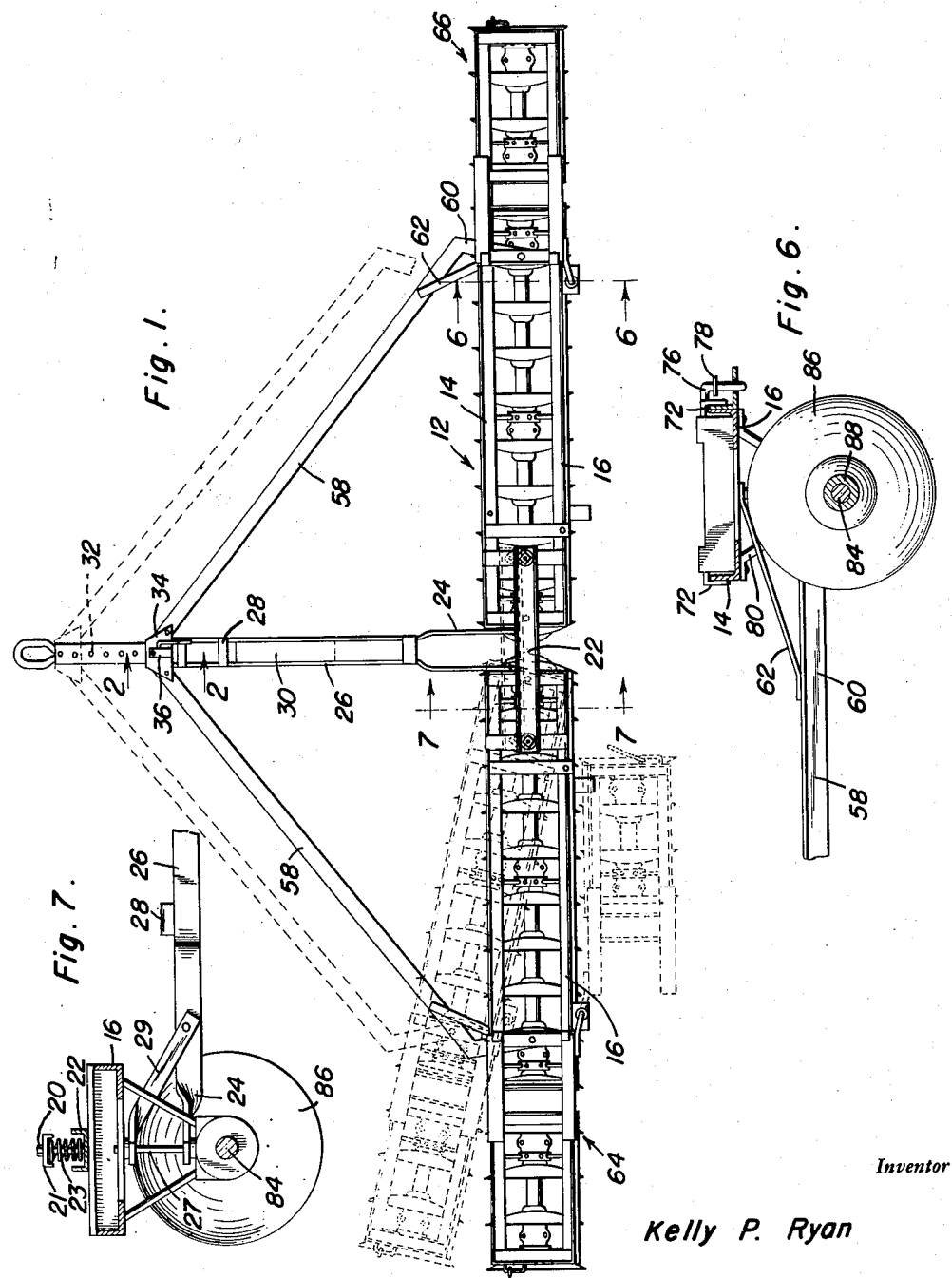
Figure 1 is a top plan view of the present disk harrow, and showing in dotted lines an alternate position for the movable frames.
Figure 2:
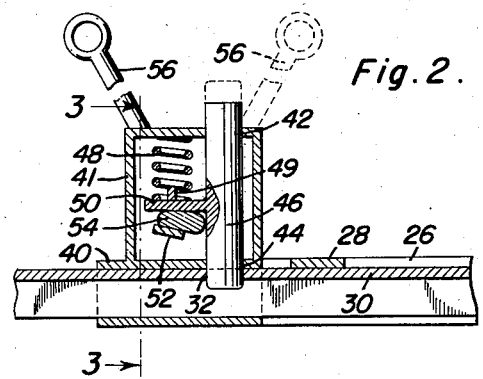
Figure 2 is an enlarged transverse vertical sectional view taken substantially on the plane of section line 2—2 of Figure 1, showing the locking pin in a normal position for holding the slidable beam, and with dotted lines showing the manner in which the locking pin is raised from its locked position.
Figure 3:
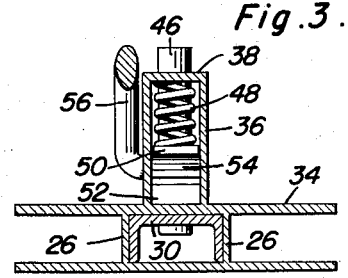
Figure 3 is a transverse vertical sectional view taken substantially on the plane of section line 3—3 of Figure 2.
Figure 4:
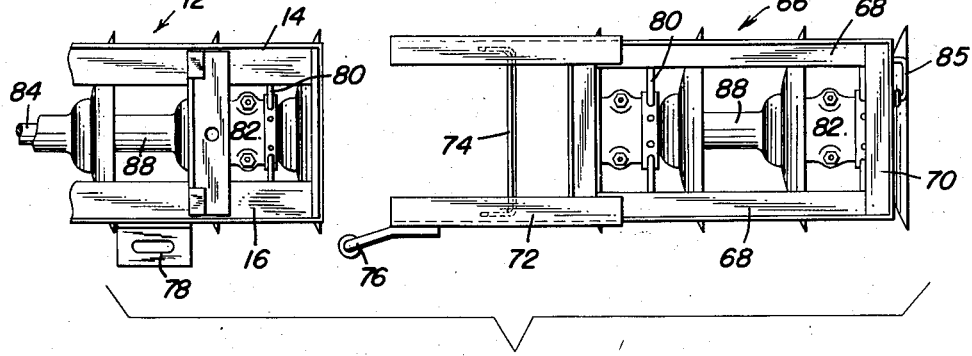
Figure 4 is a fragmentary, group, top plan view of one of the main frames and showing its end frame spaced therefrom.
Figure 5:
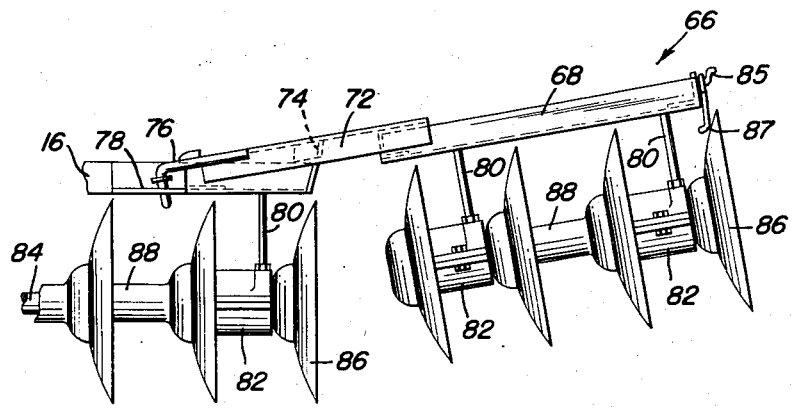
Figure 5 is a rear elevational view of Figure 4, showing the end frame applied to the main frame, and illustrating the manner in which the end frames or wings are raised and detached for rearward swinging movement, also the manner in which the end frames or wings follow the contour of the land without necessitating the use of any bolt, nut, cotter pin or other removable fastener.

Referring now to the drawings in detail, wherein for the purpose of illustration, there is disclosed a preferred embodiment of the present invention, the numerals 10 and 12 represent a pair of elongated inner or main frames generally, each of which includes a pair of spaced parallel rails 14 and 16 of preferably angle iron construction, which are braced and supported relative to each other by a plurality of longitudinally spaced bars or straps 18.

Rising from the inner ends of the main frames 10 and 12, are hold down bolts 20 that support the ends of a connecting strap or beam 22 which extends between and above the main frames. Springs 23 embrace the bolts 20 and are biased between the beam 22 and an adjusting nut washer 21.

The rear offset and angulated end portions 24 of a pair of spaced parallel guide bars 26 are pivotally mounted on tongue pins 27 depending from the frames 10 and 12 and are braced to the pins 27 by arms 29 carried by the bars 26. These guide bars 26 are connected by a plurality of upper and lower straps 28 that slidably support a draw bar or beam 30 having a plurality of longitudinally spaced apertures or openings 32, for a purpose which will later be more fully apparent.

Embracing and suitably fixed to the forward end portions of the bars 26, is a guide or casing 40 that supports a housing 41 having upper and lower walls that are apertured as at 42 and 44 to slidably receive a locking pin or holding member 46. A coil spring 48 embraces the pin 46 and is biased between the upper wall of the housing 41 and a laterally projecting arm 50 fixed to the pin 46, to normally urge the lower end of the pin 46 from the opening 44 and into engagement with a selected one of the openings 32 in the beam 30. A lug or protuberance 49 carried by the arm 50 engages the lower end of the spring 48 to prevent lateral movement thereof.

Rigidly secured to one side wall of the housing 41 and disposed within the housing, is a substantially horizontal bearing plate or abutment 52 that supports a cam 54 the ends of which are journaled on the side walls of the housing for rotation. The cam 54 is interposed between the arm 50 and plate 52 so that as the cam is rotated the pin 46 will be lifted against action of the spring 48. The plate 52 also retains the trip arm in correct position.

One end of the cam 54 is integrally formed with or rigidly secured to a crank handle or lever 56 that is selectively moved forwardly or rearwardly to rotate the cam and thereby raise or lower the locking pin 46.

Pivoted to the casing 40 are the forward terminals of a pair of actuating bars or beams 58, the angulated rear terminals 60 of which are fixed to the frames 10 and 12, adjacent the outer ends thereof, so that by forcing the beams 30 rearwardly with the trip arm or pin 46 disengaged with the beam 30, the frames 10 and 12 may be adjusted relative to each other, in a fan-like manner, with the pin 46 then received in a selected one of the openings 32, as shown best by dotted lines in Figure 1, to retain the said frames 10 and 12 inclined relative to each other, inclined relative to the direction of travel for the disk harrow, or perpendicular to the direction of travel for the disk harrow. These bars 58 are braced to the frames 10 and 12 by plates or straps 62.

The numerals 64 and 66 represent a pair of end frames or wings, generally, that are used in conjunction with the present invention. Each of these end frames include spaced parallel angle-iron side rails 68 which are connected by cross members 70.

Fixed to the inner ends of the side rails 68 are parallel extensions 72, preferably of angle iron construction, which are connected by substantially U-shaped members 74, the web portions of which engage between the upstanding flanges of the rails 14 and 16 to normally retain the end frames positioned relative to the frames 10 and 12 without pivotal movement or lateral movement relative to the main frames.

Fixed to one extension 72 for each end frame 64 and 66, is a hook element 76 that engages an eye member or slotted plate 78 which is fixed to the rail 16 of each main frame 10 and 12 for swinging movement of the end frames to a stowed position about the members 78 as pivots.

Pairs of downwardly converging arms 80 are fixed to the side rails 14 and 16 of the frames 10 and 12 and the side rails 68 of the end frames 64 and 66. Each pair of these arms 80 support bearings or journals 82.

The bearings of each frame support a shaft 84, there being a shaft for each main frame 10 and 12, and each end frame 64 and 66.

A plurality of concavo-convex plates, disks or land working elements 86 are carried by each shaft 84, and these elements are spaced relative to each other, a predetermined distance by removable spools or spacer sleeves 88 that are mounted on the shafts 84 for rotation therewith.

It is preferred that the disks 86 be fixed on the shafts 84, so that the same may rotate with the shafts 84 when they engage a land that they are working. The shafts are preferably square in cross-section so that the disks and shafts rotate as a unit in the bearings 82.

In practical use of the present invention the end frames extend longitudinally from the main frames with the rails 68 interlocked with the extensions. To place the end frames in a stowed position, and upon the main frames, handles 85 carried by the end frames are grasped so that the end frames may be raised and swung until the same are in their stowed position. Hooks 87 mounted on the handles 85 engage a suitable means on the side rails of the main frames to retain the end frames in their stowed position.

The end frames are disposed in their stowed position when the instant structure is used for working relatively narrow areas and when the same is to be moved through restricted openings in gates, lanes and the like.

Due to the adjustability of the instant structure, the same is applicable for making furrows or the like which are spaced apart a predetermined distance.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a disk harrow including a pair of disk supporting frames having inner adjacent ends, hold down bolts permanently attached to and rising from the inner ends of said frames, an elongated connecting beam extending between and overlying the inner ends of said frames and having an aperture at each of its ends receiving said bolts, said beam being supported solely by said frames, springs embracing said bolts, and abutments adjustably mounted on the upper ends of said bolts, said springs being biased between said abutments and the ends of said beam.

2. In a disk harrow including a pair of disk supporting frames having inner adjacent ends, hold down bolts permanently attached to and rising from the inner ends of said frames, an elongated connecting beam extending between the inner ends of said frames and supported solely by said frames, said beam having an aperture at each of its ends receiving said bolts, springs embracing said bolts, abutments adjustably mounted on the upper ends of said bolts, said springs being biased between said abutments and the ends of said beam, tongue pins depending from the inner ends of said frames, a draft means attached to said frames and including a pair of bars having vertical apertures receiving said tongue pins, and inclined brace arms attached to said bars and having apertures receiving said tongue pins.

3. In a disk harrow including a pair of elongated frames and a plurality of longitudinally spaced disks carried by each frame, said frames each including an inner end and said disks including inner disks at the inner ends of said frames, bolts rising from said frames and disposed outwardly of the inner disks, a connecting beam between and overlying the inner ends of said frames and supported solely by said frames, said beam including ends extending across and above the inner disk of each frame, the ends of said beam having apertures receiving said bolts, and spring means carried by said bolts and urging the ends of said beam toward said frames.

4. In a disk harrow including two elongated frames having inner end portions, a pair of vertical rods rising from the inner end portions of said frames and lying on a plane through the axes of said frames, a tie bar extending between and overlying the inner end portions of the frames and terminally slidable on said rods and supported solely by said frames, and vertical springs on said rods and urging said bar against the inner end portions of said frames.

KELLY P. RYAN.

References Cited in the file of this patent

UNITED STATES PATENTS

| Number | Name | Date |
|---|---|---|
| 1,007,982 | Sharp | Nov. 7, 1911 |
| 1,239,091 | Dickinson | Sept. 4, 1917 |
| 1,277,400 | French | Sept. 3, 1918 |
| 1,846,005 | Hoffman | Feb. 16, 1932 |
| 1,941,504 | White | Jan. 2, 1934 |
| 2,002,272 | Mowry | May 21, 1935 |
| 2,098,116 | Warne | Nov. 2, 1937 |
| 2,163,818 | White | June 27, 1939 |
| 2,226,587 | Seaholm | Dec. 31, 1940 |
| 2,318,275 | White | May 4, 1943 |
| 2,345,803 | Gemberling | Apr. 4, 1944 |
| 2,377,521 | Rutter | June 5, 1945 |
| 2,470,008 | White et al. | May 10, 1949 |
| 2,571,512 | Youngberg | Oct. 16, 1951 |